US011239927B2

(12) United States Patent
Zhou et al.

(10) Patent No.: US 11,239,927 B2
(45) Date of Patent: Feb. 1, 2022

(54) RRC INDICATION TO ENABLE PATHLOSS REFERENCE SIGNAL UPDATES VIA MAC-CE

(71) Applicant: QUALCOMM Incorporated, San Diego, CA (US)

(72) Inventors: Yan Zhou, San Diego, CA (US); Tao Luo, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 17/082,748

(22) Filed: Oct. 28, 2020

(65) Prior Publication Data

US 2021/0159991 A1 May 27, 2021

Related U.S. Application Data

(60) Provisional application No. 62/938,919, filed on Nov. 21, 2019.

(51) Int. Cl.
| | |
|---|---|
| *H04B 17/309* | (2015.01) |
| *H04L 5/00* | (2006.01) |
| *H04W 24/06* | (2009.01) |
| *H04W 72/04* | (2009.01) |
| *H04W 76/27* | (2018.01) |
| *H04W 24/10* | (2009.01) |

(52) U.S. Cl.
CPC ......... *H04B 17/309* (2015.01); *H04L 5/0048* (2013.01); *H04L 5/0098* (2013.01); *H04W 24/06* (2013.01); *H04W 24/10* (2013.01); *H04W 72/042* (2013.01); *H04W 72/0413* (2013.01); *H04W 76/27* (2018.02)

(58) Field of Classification Search
CPC ..... H04B 17/309; H04W 76/27; H04L 5/0048
USPC ........................................................ 370/252
See application file for complete search history.

(56) References Cited

U.S. PATENT DOCUMENTS

| | | | |
|---|---|---|---|
| 2020/0100193 A1* | 3/2020 | Cheng | H04W 72/1268 |
| 2020/0252241 A1* | 8/2020 | Park | H04L 1/00 |
| 2020/0267663 A1* | 8/2020 | Xu | H04B 17/327 |
| 2020/0305088 A1* | 9/2020 | Nory | H04W 52/242 |
| 2020/0389852 A1* | 12/2020 | Wang | H04W 52/146 |
| 2020/0389885 A1* | 12/2020 | Tomeba | H04W 72/0413 |

(Continued)

OTHER PUBLICATIONS

International Search Report and Written Opinion—PCT/US2020/057916—ISA/EPO—dated Feb. 15, 2021.

(Continued)

*Primary Examiner* — Peter G Solinsky
(74) *Attorney, Agent, or Firm* — Procopio, Cory, Hargreaves & Savitch LLP

(57) ABSTRACT

A method, a computer-readable medium, and an apparatus are provided for wireless communication at a user equipment. The UE receives an indication from a base station that a medium access control-control element (MAC-CE) activation of a pathloss reference signal is enabled. The UE receives a MAC-CE activating the pathloss reference signal. The UE determines the pathloss reference signal based on the MAC-CE and the indication that indicates that the MAC-CE activation of the pathloss reference signal is enabled. Then, the UE estimates a downlink pathloss based on the pathloss reference signal that is activated by the MAC-CE.

45 Claims, 10 Drawing Sheets

(56) References Cited

U.S. PATENT DOCUMENTS

2021/0058871 A1* 2/2021 Ryu .................... H04W 80/02
2021/0084510 A1* 3/2021 Ryu .................... H04B 17/309

OTHER PUBLICATIONS

Nokia, et al., "Enhancements on Multi-Beam Operation", 3GPP Draft, 3GPP TSG RAN WG1 #99, R1-1912720, 3RD Generation Partnership Project (3GPP), Mobile Competence Centre, 650, Route Des Lucioles, F-06921 Sophia-Antipolis Cedex, France, vol. RAN WG1, No. Reno, USA, Nov. 18, 2019-Nov. 22, 2019 Nov. 8, 2019 (Nov. 8, 2019), XP051820170, 12 Pages, Retrieved from the Internet: URL:https://ftp.3gpp.org/tsg_ran/WG1_RL1/TSGR1_99/Docs/R1-1912720.zipR1-1912720.docx [retrieved on Nov. 8, 2019] paragraph [2.1.2].

NTT DOCOMO, INC: "Discussion on Multi-Beam Enhancement", Draft, 3GPP TSG RAN WG1 #98bis, R1-1911185, 3rd Generation Partnership Project (3GPP), Mobile Competence Centre, 650, Route Des Lucioles, F-06921, Sophia-Antipolis Cedex, France, vol. RAN WG1, No. Chongqing, China, Oct. 14, 2019-Oct. 20, 2019, Oct. 4, 2019 (Oct. 4, 2019), XP051789957, pp. 1-20, URL: http://www.3gpp.org/ftp/tsg_ran/WG1_RL1/TSGR1_98b/Docs/R1-1911185.zip R1-1911185.docx [retrieved on Oct. 4, 2019] Section 3.3, p. 4, paragraph [03.3]—p. 5, p. 3-4, Section 3.2.

Qualcomm Incorporated: "Enhancements on Multi-Beam Operation", Draft, 3GPP TSG-RAN WG1 Meeting #98, R1-1911127, 3rd Generation Partnership Project (3GPP), Mobile Competence Centre, 650, Route Des Lucioles, F-06921 Sophia-Antipolis Cedex, France, vol. RAN WG1, No. Chongqing, China, Oct. 14, 2019-Oct. 20, 2019, Oct. 5, 2019 (Oct. 5, 2019), XP051808850, 22 Pages, URL: https://ftp.3gpp.org/tsg_ran/WG1_RL1/TSGR1_98b/Docs/R1-1911127.zip [retrieved on Oct. 5, 2019] p. 4-p. 10 Section 2 figures 1, 2, Section 3, p. 16, paragraph 7.2.

* cited by examiner

RRC INDICATION TO ENABLE PATHLOSS REFERENCE SIGNAL UPDATES VIA MAC-CE

CROSS REFERENCE TO RELATED APPLICATION(S)

This application claims the benefit of U.S. Provisional Application Ser. No. 62/938,919, entitled "RRC Indication to Enable Pathloss Reference Signal Updates via MAC-CE" and filed on Nov. 21, 2019, which is expressly incorporated by reference herein in its entirety.

BACKGROUND

Technical Field

The present disclosure relates generally to communication systems, and more particularly, to wireless communication including a pathloss reference signal.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication. In some examples, the apparatus may be a user equipment (UE). The apparatus receives an indication from a base station that a medium access control-control element (MAC-CE) activation of a pathloss reference signal is enabled. The apparatus receives a MAC-CE activating the pathloss reference signal. The apparatus determines the pathloss reference signal based on the MAC-CE and the indication that indicates that the MAC-CE activation of the pathloss reference signal is enabled. Then, the UE estimates a downlink pathloss based on the pathloss reference signal that is activated by the MAC-CE.

In another aspect of the disclosure, a method, a computer-readable medium, and an apparatus are provided for wireless communication at a base station. The apparatus transmits an indication to a UE that a MAC-CE activation of a pathloss reference signal is enabled. Then, the apparatus transmits a MAC-CE activating the pathloss reference signal based on the indication that indicates that the MAC-CE activation of the pathloss reference signal is enabled.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
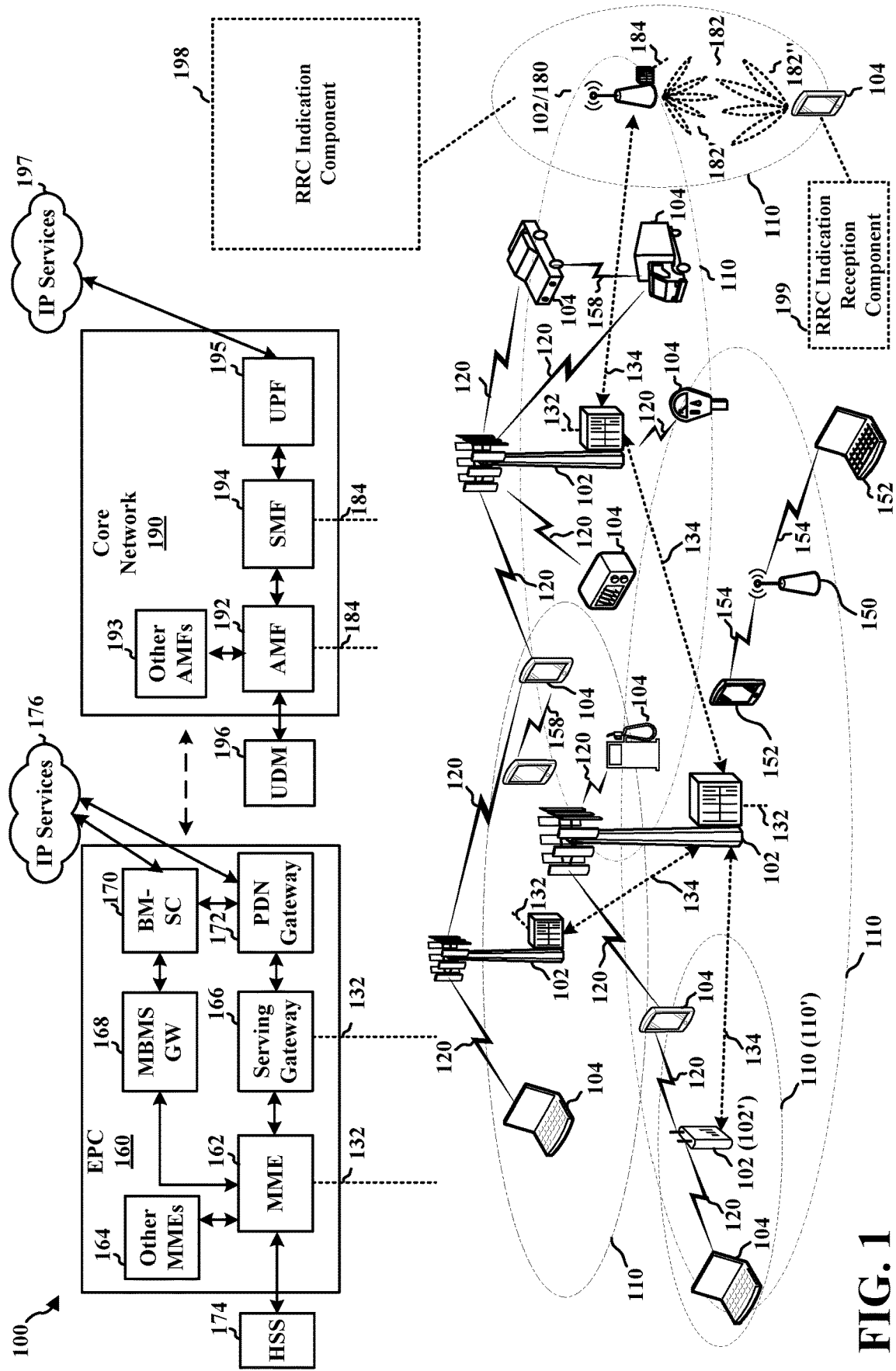
FIG. 1 is a diagram illustrating an example of a wireless communications system and an access network, in accordance with aspects presented herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100 including base stations 102 and 180 and UEs 104. Aspects presented herein enable a base station 102 or 180 to configure a UE 104 for improved pathloss reference signals. The UE 104 may use pathloss reference signals identified by the base station 102 or 180 to measure pathloss and determine a transmission power for an uplink signal. The aspects presented herein enable a base station to update the pathloss reference signal in a more dynamic manner. As described herein, the base station 102 or 180 may include an RRC indication component 198 configured to transmit an indication to a UE that a MAC-CE update or activation of a pathloss reference signal is enabled. Then, the base station 102 or 180 may transmit the MAC-CE activating a particular pathloss reference signal. The UE 104 may include an RRC indication reception component 199 configured to receive an indication from a base station that a MAC-CE update or activation of a pathloss reference signal is enabled. The UE may receive a MAC-CE activating a particular pathloss reference signal. The UE may determine the pathloss reference signal based on the MAC-CE and the indication that indicates that the MAC-CE activation of the pathloss reference signal is enabled. The UE may then use the activated pathloss reference signal to estimate a downlink pathloss. The UE may use the estimated downlink pathloss to determine a transmission power for an uplink signal, e.g., an SRS or a PUSCH.

The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the following description may be focused on 5G NR, the concepts described herein may be applicable to other similar areas, such as LTE, LTE-A, CDMA, GSM, and other wireless technologies.

Figure 2:
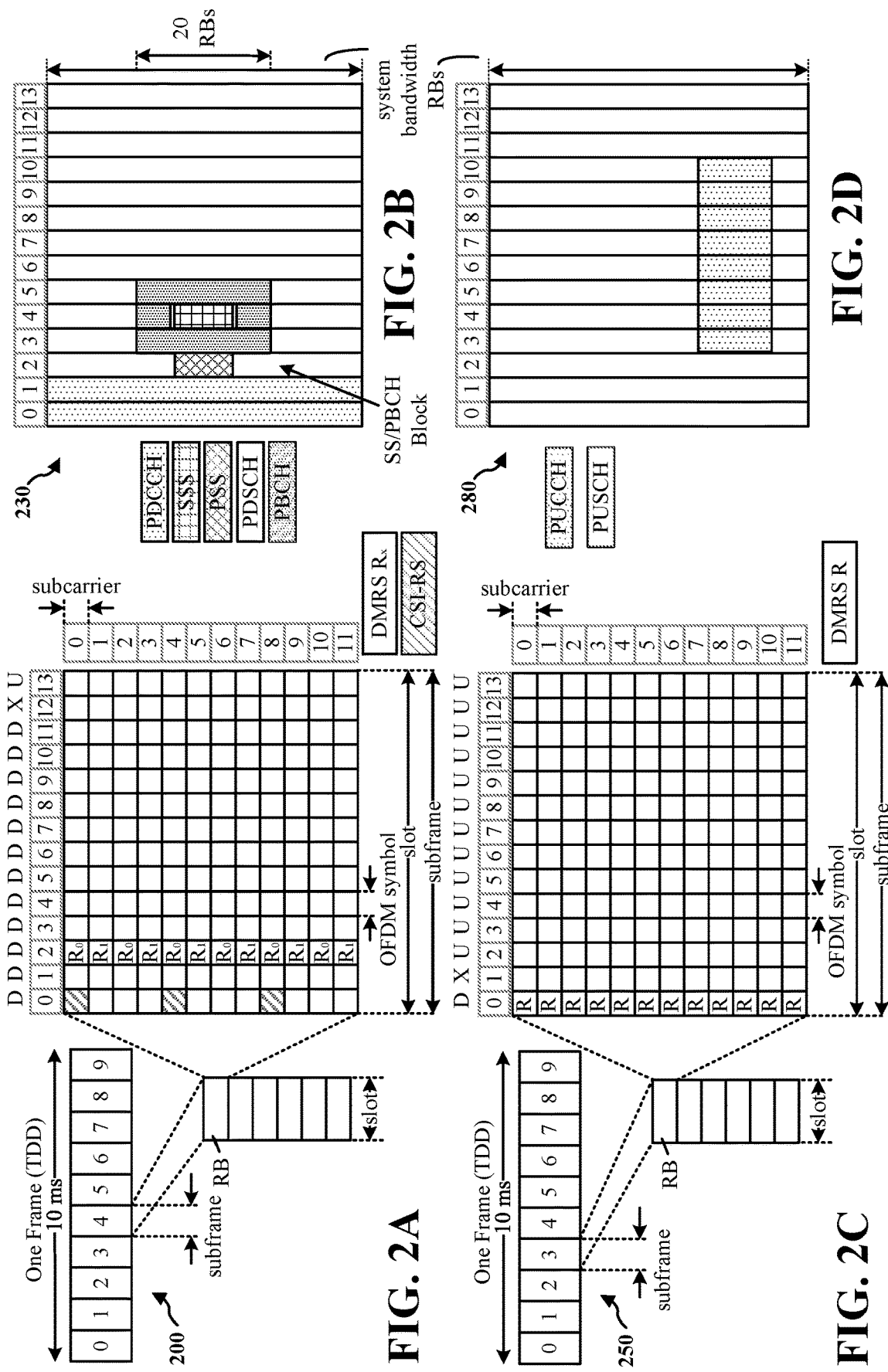
FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu * 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=0$ with 1 slot per subframe. The subcarrier spacing is 15 kHz and symbol duration is approximately 66.7 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
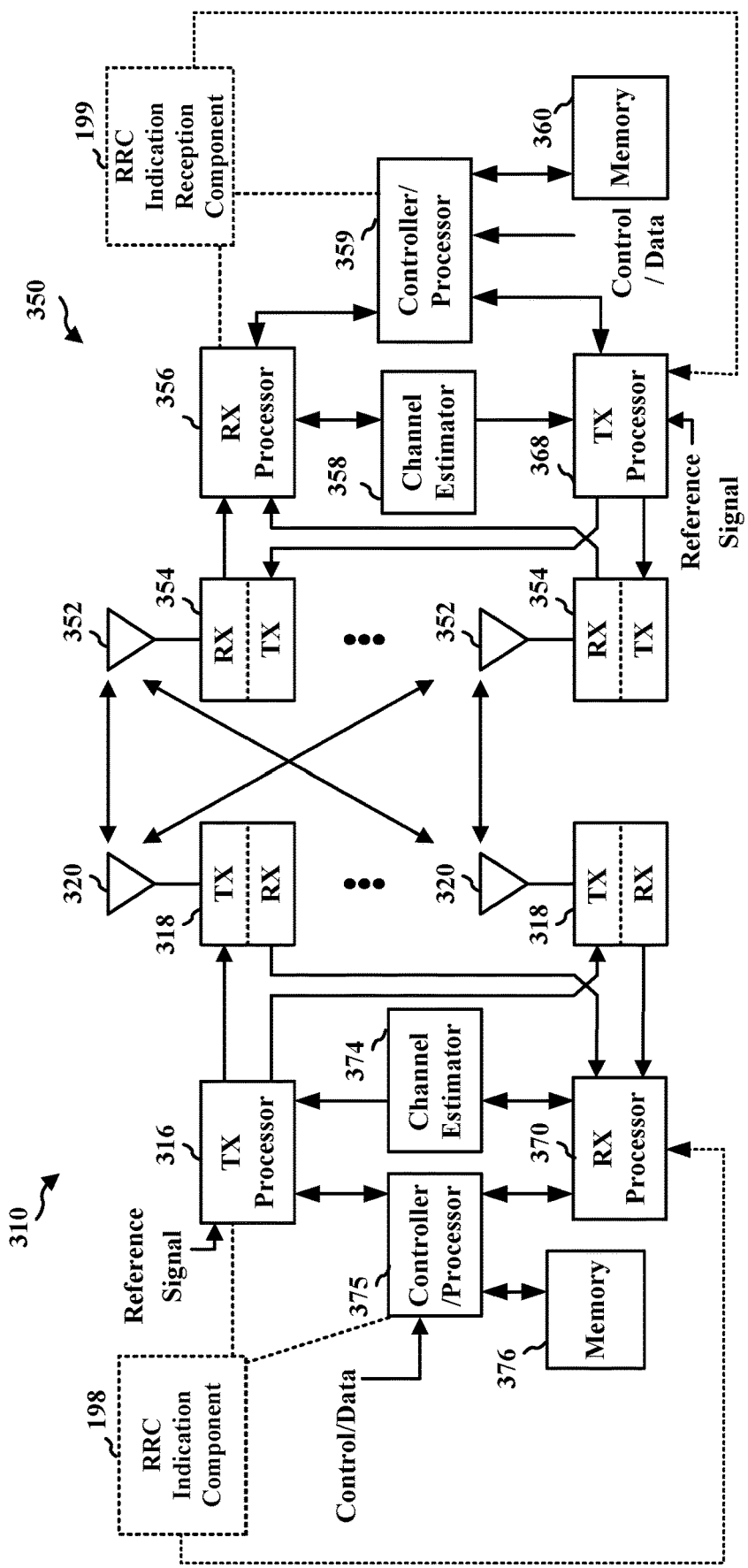
FIG. 3 is a diagram illustrating an example of a base station and user equipment (UE) in an access network, in accordance with aspects presented herein.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 199 of FIG. 1.

At least one of the TX processor 316, the RX processor 370, and the controller/processor 375 may be configured to perform aspects in connection with 198 of FIG. 1.

Communication between a base station and a UE may need to adapt to variations of a wireless channel. One adaptation may include power control. The transmitted power may be varied based on channel quality. Power control may be applied for downlink transmissions and for uplink transmissions. Uplink power control may help to avoid interference caused by the uplink transmission and to reduce UE power consumption while ensuring that uplink transmissions may be accurately received by a base station. A UE may increase transmission power to compensate for increased pathloss. In order to determine the pathloss, the UE may measure a reference signal, such as a pathloss reference signal, from the base station to determine the pathloss. The UE may use the pathloss measurement, along with other factors, to determine a transmission power for uplink transmissions transmitted by the UE.

Pathloss reference signals may be configured for an uplink signal of the UE, for an uplink channel of the UE, etc. For example, pathloss reference signals may be configured for the UE for use in power control for a sounding reference signal (SRS), a PUSCH, and/or a PUCCH.

Pathloss reference signals can be updated, e.g., by medium access control-control element (MAC-CE). For example, a base station may use RRC signaling to configure a set of pathloss reference signals for SRS at the UE. Then, the base station may activate a pathloss reference signal for a particular uplink signal, each activated pathloss reference signal being from the configured set of pathloss reference signals. The configured set of pathloss reference signals may be referred to as a configured pathloss reference signal pool.

Figure 4:
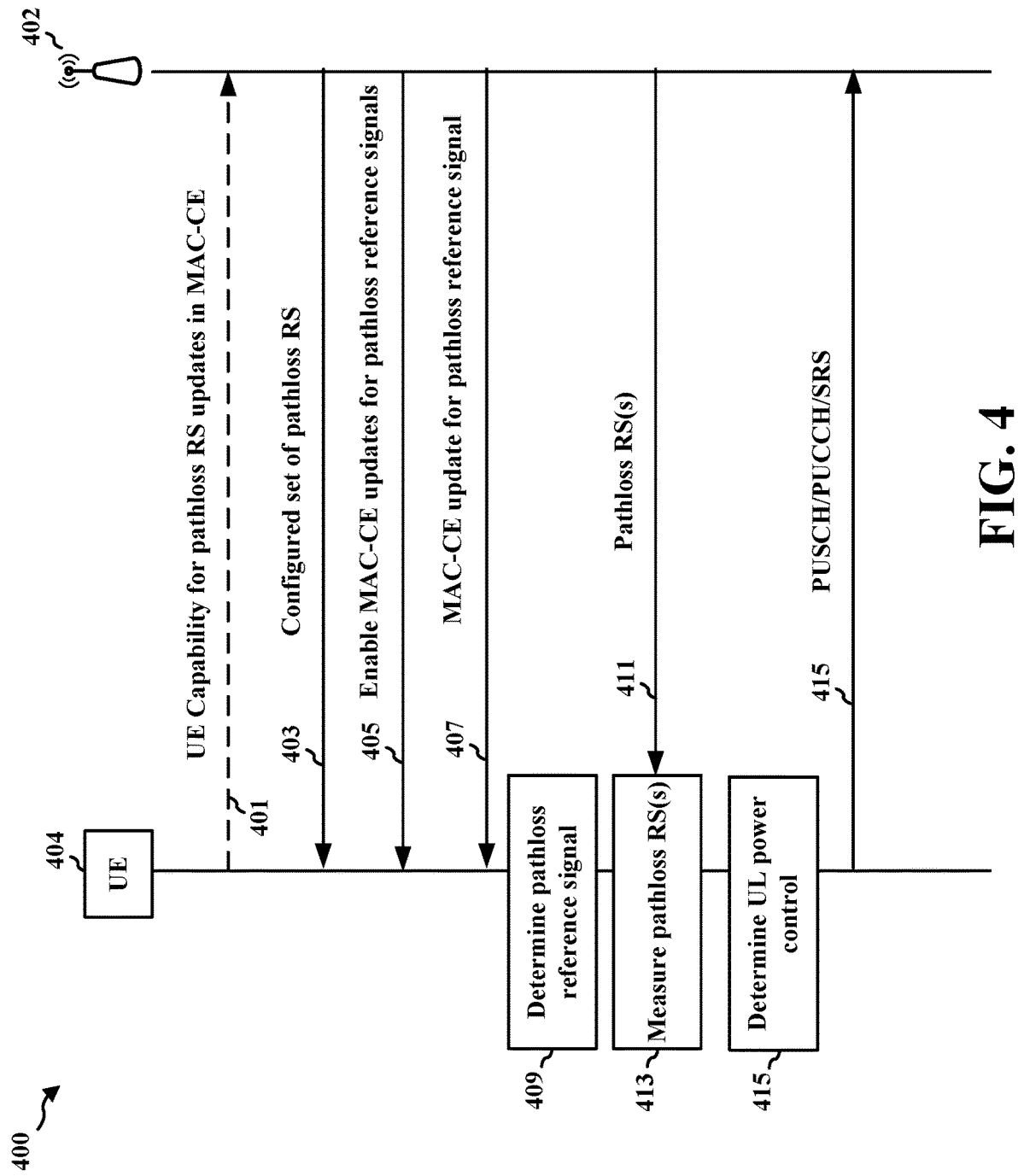
FIG. 4 is a communication flow between a UE and a base station including enabling MAC-CE updates for a pathloss reference signal, in accordance with aspects presented herein.

As presented herein, a base station may provide an indication to the UE informing the UE whether a feature for updating the pathloss reference signals via MAC-CE is enabled. The base station may use signalling flag(s) to inform UE that the feature is enabled for updating pathloss via MAC-CE. FIG. 4 illustrates an example communication flow 400 between a base station 402 and a UE 404 that includes signalling 405 to enable MAC-CE updates for pathloss reference signals. In an example, the base station 402 may send an RRC configuration, at 405, enabling MAC-CE updates for the pathloss reference signal. As an example, if the UE 404 receives an indication in RRC signalling that pathloss reference signal updates (e.g., for SRS and/or PUSCH) are enabled, the UE may receive indications updating the pathloss reference signal in a MAC-CE, e.g., at 407. For example, the MAC-CE may include an ID for a pathloss reference signal that is activated. If the indication is not present in RRC signalling (e.g., if the UE does not receive the indication, at 405), the UE 404 may determine that the pathloss reference signal may not be updated via MAC-CE.

The updates that are enabled for the pathloss reference signal (PL RS) via MAC-CE may include any combination of sub-features such as (1) pathloss reference signal updates for SRS via MAC-CE, (2) pathloss reference signal for PUSCH scheduled by DCI with SRI field, (3) pathloss reference signal for PUSCH not scheduled by DCI with SRI, or (4) pathloss reference signal for PUSCH (such as a combination of sub-features 2 & 3).

In some examples, the MAC-CE update may be enabled for the pathloss reference signals for SRS and PUSCH. In some examples, the MAC-CE update may be enabled for the pathloss reference signals for SRS and PUSCH scheduled by DCI with an SRI field. In some examples, the updates for the pathloss reference signal for PUSCH that is scheduled by a DCI format that does not include an SRI field (e.g., DCI format 0_1, etc.), the pathloss reference signal may be determined based on a default SRI (e.g., SRI-PUSCH-PowerControlId=0) when pathloss updates via MAC-CE are enabled.

In some examples, the base station 402 may use a single indication, at 405, to indicate that MAC-CE updates are enabled for pathloss reference signals for multiple uplink signals. For example, a single indication may indicate that MAC-CE updates are enabled for the UE 404 for the pathloss reference signals for SRS and PUSCH. In some examples, the base station 402 may use a single flag to enable all of the sub-features or individual sub-features of updating a pathloss reference signal via MAC-CE. In other examples, the base station 402 may use individual flags, at 405, to indicate whether different sub-features are enabled for the UE 404. The base station 402 may set a flag, e.g., provide an indication at 405 to the UE 404, when the base station 402 receives UE capability signalling 401 from the UE 404 that indicates that the UE 404 supports a MAC-CE updates for a pathloss reference signal for one or more uplink signals.

The flag, or indication, at 405 can be explicit, e.g. an explicit indication in RRC/MAC-CE/DCI messages. In a first example, the base station 402 may send an indication in RRC signalling (e.g., 405) to the UE that indicates that the MAC-CE updates are enabled for the pathloss reference signal for one or more uplink signals (e.g., SRS, PUSCH, etc.) (e.g., "enablePLRSupdateForPUSCHSRS"). In another example, the base station 402 may send an indication, at 405, in a MAC-CE to the UE 404 that indicates that the MAC-CE updates are enabled for the pathloss reference signal for one or more uplink signals. In another example, the base station 402 may send DCI that includes an indication, at 405, that the MAC-CE updates are enabled for the pathloss reference signal for one or more uplink signals. In some examples, the flag, or indication, can be implicit. For example, the base station may indicate that MAC-CE updates for a pathloss reference signal are enabled when a corresponding MAC-CE is sent to the UE 404 updating a pathloss reference signal.

In some examples, the base station 402 may use the flag, e.g., provide the indication 405 to the UE 404, independent of a number of configured pathloss reference signals. For example, a sub-feature may be enabled regardless of the number of configured pathloss reference signals. In some examples, the base station 402 may use the flag, or provide the indication 405 to the UE 404, when a number of configured pathloss reference signals for the UE meets a threshold, e.g., exceeds a threshold number of. In one example, the base station 402 may use the flag when the number of configured pathloss reference signals exceeds four. For example, a sub-feature may be enabled when the number of configured pathloss reference signals exceeds a threshold number.

The UE 404 may perform filtering, such as L3 filtering, per activated pathloss reference signal, e.g., as part of measuring the pathloss at 413. The filtering may help the UE 404 to determine a more stable pathloss value for the SRS power control, e.g., at 415. The SRS may include an aperiodic SRS (AP-SRS) and/or a semi-persistent SRS (SP-SRS). Thus, the pathloss reference signal(s) for AP-SRS/SP-SRS may be activated or updated by the base station using a MAC-CE, at 407.

The UE 404 may be configured with multiple pathloss reference signals by RRC signaling from the base station, at 403, and one of the configured pathloss reference signals may be activated/updated by a MAC-CE for a particular SRS resource set, at 407 based on the enablement of the MAC-CE updates, at 405.

The base station 402 may update pathloss reference signals per SRS resource indicator (SRI) associated with a PUSCH transmission using a MAC-CE, at 407. For example, the base station 402 may use RRC signaling to configure a set of pathloss reference signals for the UE, at 403. Then, the base station 402 may activate a pathloss reference signal per SRI, at 407, each activated pathloss reference signal being from the configured set of pathloss reference signals. The UE may perform L3 filtering per activated pathloss reference signal 411, e.g., as part of measuring the pathloss at 413. The L3 filtering may help the UE to determine a more stable pathloss value, at 413, for the PUSCH power control. As illustrated at 415, the UE 404 may use the pathloss determined, at 413, for the identified pathloss reference signal to determine uplink power control, at 415. Then, the UE 404 may apply a transmission power that is determined at 415 to transmit an uplink signal, at 415, such as SRS, PUSCH, PUCCH, etc. Thus, a MAC-CE message, e.g., 407, from the base station 402 may activate/update a value of a PUSCH pathloss reference signal identifier (ID) (which may be referred to, e.g., by a parameter such as "PUSCH-PathlossReferenceRS-Id"). When MAC-CE updates are enabled, at 405, the UE 404 may use the information provided in the MAC-CE, at 407, to identify a pathloss reference signal for performing a downlink pathloss estimate. For example, the UE 404 may identify, at 409, a reference signal resource index for the pathloss reference signal using information received in the MAC-CE, at 407. For example, the UE 404 may determine that the PUSCH pathloss reference signal ID corresponds to an SRI PUSCH power control ID (which may be referred to, e.g., by a parameter such as "sri-PUSCH-powercontrolId"). A mapping may be given by SRI PUSCH power control having a link between the SRI PUSCH power control ID and a PUSCH pathloss reference signal ID. The UE 404 may use the mapping to determine, at 409, the pathloss reference signal resource to use for performing the pathloss estimate, at 413.

A higher layer filtered reference signal received power (RSRP) may be used for a pathloss measurement. The base station 402 may provide an amount of time following the MAC-CE, e.g., 407, for the UE 404 to perform the pathloss measurement. For example, a filtered RSRP value for the previous pathloss reference signal may be used until a particular time, which may be referred to as an application time. For example, the application time may be the next slot after a fifth measurement sample, where the first measurement sample corresponds to the first instance of the pathloss reference signal. The first instance of the pathloss reference signal may be, e.g., 3 ms after the UE sends an ACK in response to receiving the MAC-CE that activates the pathloss reference signal.

The activation, via the MAC-CE, of configured pathloss reference signals may be applicable for UEs supporting more than four RRC-configurable pathloss reference signals and may be applicable when a pathloss reference signal that is activated by the MAC-CE is not tracked by the UE 404. In some examples, the UE 404 may track the activated pathloss reference signal(s) if more than four pathloss reference signals are configured in RRC signaling from the base station. The UE 404 may determine whether to update filtered RSRP values for a previous pathloss reference signal, e.g., 3 ms after sending the ACK in response to the MAC-CE, e.g., 407, that activates the new pathloss reference signal.

When a PUSCH (e.g., 415) is scheduled by DCI format 0_1, the DCI may have no SRI field. At 409, the UE may determine the pathloss reference signal, e.g., 411, for the PUSCH transmission may be determined based on a default SRI, e.g., with ID 0. The default SRI may be semi-statically configured by RRC, and not dynamically updated, e.g. when the transmit beam of the SRS resource is updated.

If a grant-based or grant-free PUSCH transmission (e.g., a grant-based PUSCH, grant-free PUSCH, configured grant PUSCH, etc.) is scheduled/activated by DCI format 0_1 that does not include a SRI field, the RS resource index for a pathloss estimate (e.g., qd) may be based on a PUSCH pathloss reference signal ID (e.g., "PUSCH-PathlossReferenceRS-Id") that is mapped with a default SRI PUSCH power control ID (e.g., "sri-PUSCH-PowerControlId=0").

In some examples, the UE 404 may determine the pathloss reference signal resource based on the default SRI ID based on the number of configured pathloss reference signals for PUSCH. For example, this determination of the pathloss reference signal may be applied when the number of configured PUSCH path-loss RSs by RRC is greater than a threshold number such as 4. This determination of the RS resource for pathloss measurement may be applied based on the UE's support for the feature of MAC-CE based update for PUSCH pathloss reference signal(s). If the UE 404 does not support the feature of MAC-CE based update for PUSCH pathloss reference signal(s), the UE may determine the pathloss reference signal for PUSCH in a different manner.

An RRC information element (IE), such as an SRI PUSCH power control IE, may be configured at least with an SRI PUSCH power control identifier (ID). As an example, the SRI PUSCH power control ID=X may be configured, where X is a fixed ID such as 0. The SRI PUSCH power control ID may provide the default SRI information that the UE 404 may use to determine the pathloss reference signal for PUSCH scheduled by DCI without SRI (e.g., DCI format 0_1) if the feature of pathloss reference signal updates via MAC-CE is enabled for the UE 404, e.g., at 405.

The RRC information element (IE) may be included when the flag, or other indication from the base station at 405, enables the feature of pathloss reference signal updates via MAC-CE for PUSCH not scheduled by DCI with SRI. The RRC information element may be included when the flag, or other indication, from the base station 402 enables the feature of pathloss reference signal updates via MAC-CE in general. The RRC information element may be included when the UE 404 indicates support, at 401, for the feature of pathloss reference signal updates via MAC-CE for PUSCH not scheduled by DCI with SRI. The RRC information element may be included when UE 404 indicates support, at 401, for the feature of pathloss reference signal updates via MAC-CE for PUSCH. The RRC information element may be included when UE 404 indicates support, at 401, for the feature of pathloss reference signal updates via MAC-CE in general.

In some examples, pathloss reference signal updates via MAC-CE may be enabled when the number of configured pathloss reference signals exceeds a threshold number, e.g. 4. Four is merely one example to illustrate the concept, and the threshold number may be a different number than 4.

In some examples, the feature of pathloss reference signal updates via MAC-CE may be enabled independent of the number of configured pathloss reference signals. For example, the features may be enabled when the number of configured pathloss reference signals is more than four, as well as less than four. As discussed above, the MAC-CE updates for pathloss reference signal may include any of pathloss reference signal update for SRS via MAC-CE, pathloss reference signal update for PUSCH scheduled by DCI with SRI field, pathloss reference signal update for PUSCH not scheduled by DCI with SRI, or pathloss reference signal update for PUSCH.

For a PUSCH scheduled by DCI format 0_0 on a cell, the UE 404 may transmit PUSCH according to the spatial relation, if applicable, corresponding to the dedicated PUCCH resource with the lowest ID and configured PUCCH spatial relation information, (e.g., "PUCCH-SpatialRelationInfo"), within the active uplink bandwidth part (UL BWP) of the cell.

If the PUSCH transmission is scheduled by a DCI format 0_0, and if the UE 404 is provided a spatial setting by PUCCH spatial relation information (e.g., "PUCCH-SpatialRelationInfo") for a PUCCH resource with a lowest index and configured PUCCH spatial relation information for active UL BWP of each carrier and serving cell, the UE 404 may use the same RS resource index as for a PUCCH transmission in the PUCCH resource with the lowest index and configured PUCCH spatial relation information.

The UE 404 may not expect a PUSCH scheduled by DCI format 0_0 in a BWP without configured PUCCH resource with PUCCH spatial relation information, or with configured PUCCH resource(s) but the PUCCH resource with lowest resource ID has no PUCCH spatial relation information configured, in frequency range 2 in RRC connected mode.

The PUSCH may be scheduled by DCI format 0_0 on the CC in FR2 and in RRC-connected mode with PUCCH resource(s) configured, where the configured PUCCH resource with lowest ID is not configured with any spatial relation. The spatial relation and the PL RS for the PUSCH scheduled by DCI format 0_0 may follow those for the PUCCH resource(s), which are the default spatial relation and the default pathloss RS, respectively.

Figure 5:
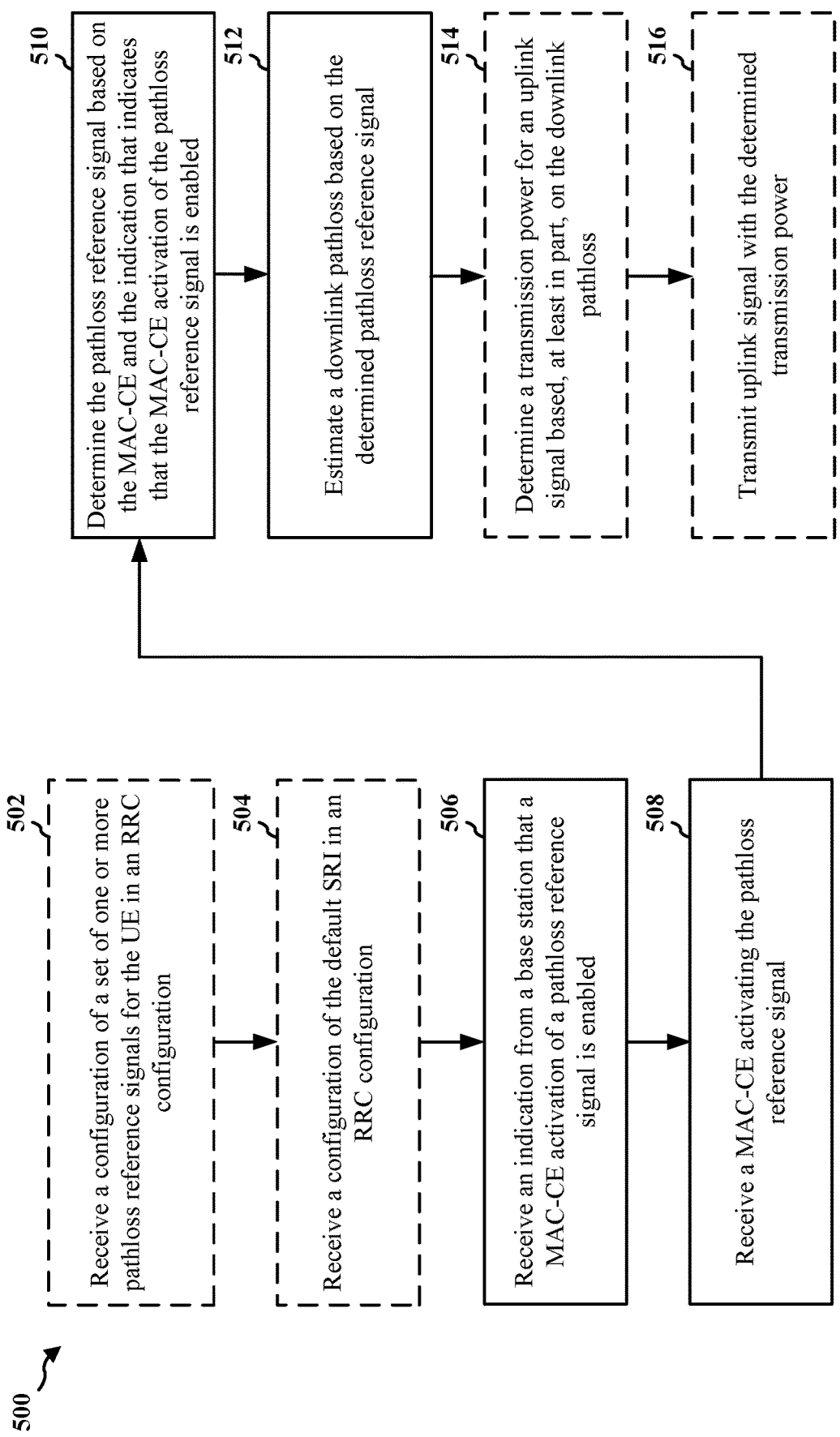
FIG. 5 is a flowchart of a method of wireless communication including MAC-CE updates for a pathloss reference signal, in accordance with aspects presented herein.

FIG. 5 is a flowchart 500 of a method of wireless communication. The method may be performed by a UE or a component of a UE (e.g., the UE 104, 350 404 the apparatus 602/602'; the processing system 714, which may include a processing system that may include the memory 360 and which may be the entire UE 350 or a component of the UE 350, such as the TX processor 368, the RX processor 356, and/or the controller/processor 359). Optional aspects are illustrated with a dashed line. The method may enable the UE to make more accurate pathloss reference signal estimates through enabling more dynamic updates of the pathloss reference signal.

At 506, the UE receives an indication from a base station that a MAC-CE activation of a pathloss reference signal is enabled. The reception may be performed, e.g., by the reception component 604 and/or enable component 608 of the apparatus 602 in FIG. 6. The indication may be received in RRC signaling. The indication may enable the MAC-CE activation for the pathloss reference signal for a particular uplink signal. For example, the indication may enable the MAC-CE activation of a pathloss reference signal for an SRS. The indication may enable the MAC-CE activation of the pathloss reference signal update for a PUSCH. The indication may enable the MAC-CE activation of the pathloss reference signal update for a PUSCH that is scheduled by DCI with an SRI field. The indication may enable the MAC-CE activation for the pathloss reference signal for a PUSCH that is scheduled based on a DCI format without a SRI field. The indication may indicate for the UE to identify the pathloss reference signal based on a default SRI. As illustrated at 504, the UE may receive a configuration of the default SRI in an RRC configuration. The reception may be performed, e.g., by the SRI component 620 of the apparatus 602 in FIG. 6. As described, in some examples, the UE may receive different indications to enable the MAC-CE activation of a pathloss reference signal for different uplink signals. In other examples, the UE may receive a single indication that enables the MAC-CE activation of pathloss reference signals for multiple uplink signals. The indication may include a single indication that enable a MAC-CE activation for the pathloss reference signal for a SRS and a PUSCH. The indication may include any of the aspects described in connection with the indication 405 in FIG. 4, for example.

At 508, the UE receives a MAC-CE activating the pathloss reference signal. The reception may be performed, e.g., by the reception component 604 and/or MAC-CE component 610 of the apparatus 602 in FIG. 6. The MAC-CE may comprise a reference signal ID for the pathloss reference signal that is activated by the MAC-CE. The MAC-CE may indicate or update a mapping between a pathloss reference signal ID and an SRI for physical uplink shared channel power control. The MAC-CE update may include aspects described in connection with the MAC-CE 407 in FIG. 4.

As illustrated at 502, the UE may receive a configuration of a set of one or more pathloss reference signals for the UE in an RRC configuration. Then, based on the enablement at 506, the MAC-CE may activate at least one of the one or more pathloss reference signals. The reception may be performed, e.g., by the pathloss reference signal component 618 of the apparatus 602 in FIG. 6.

At 510, the UE determines the pathloss reference signal based on the MAC-CE and the indication that indicates that the MAC-CE activation of the pathloss reference signal is enabled. The determination may be performed, e.g., by the determination component 612 of the apparatus 602 in FIG. 6. For example, the UE may identify the pathloss as described in connection with any of the aspects of FIG. 4. For example, if the UE the MAC-CE activation of the pathloss reference signal is enabled, at 506, the UE may determine the pathloss reference signal based on information in the MAC-CE, e.g., as described in connection with FIG. 4.

As illustrated at 512, the UE may estimate a downlink pathloss based on the determined pathloss reference signal, e.g., the pathloss reference signal activated by the MAC-CE. For example, the UE may estimate the pathloss using the reference signal as described in connection with any of the aspects of FIG. 4. The estimation may be performed, e.g., by the pathloss measurement component 614 of the apparatus 602 in FIG. 6.

At 514, the UE may determine a transmission power for an uplink signal based, at least in part, on the estimated downlink pathloss. For example, the UE may determine the transmission power as described in connection with FIG. 4. The determination may be performed, e.g., by the power component 616 of the apparatus 602 in FIG. 6.

At 516, the UE may transmit the uplink signal using the determine transmission power. Thus, the MAC-CE update of the pathloss reference signal may be used by the UE for transmission power control, e.g., as described in connection with any of the aspects of FIG. 4. The transmission may be performed, e.g., by the transmission component 606 of the apparatus 602 in FIG. 6.

As such, each block in the aforementioned flowchart of FIG. 5 may be performed by a component of a UE, such as the RRC flag reception component 199 and the UE may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 6:
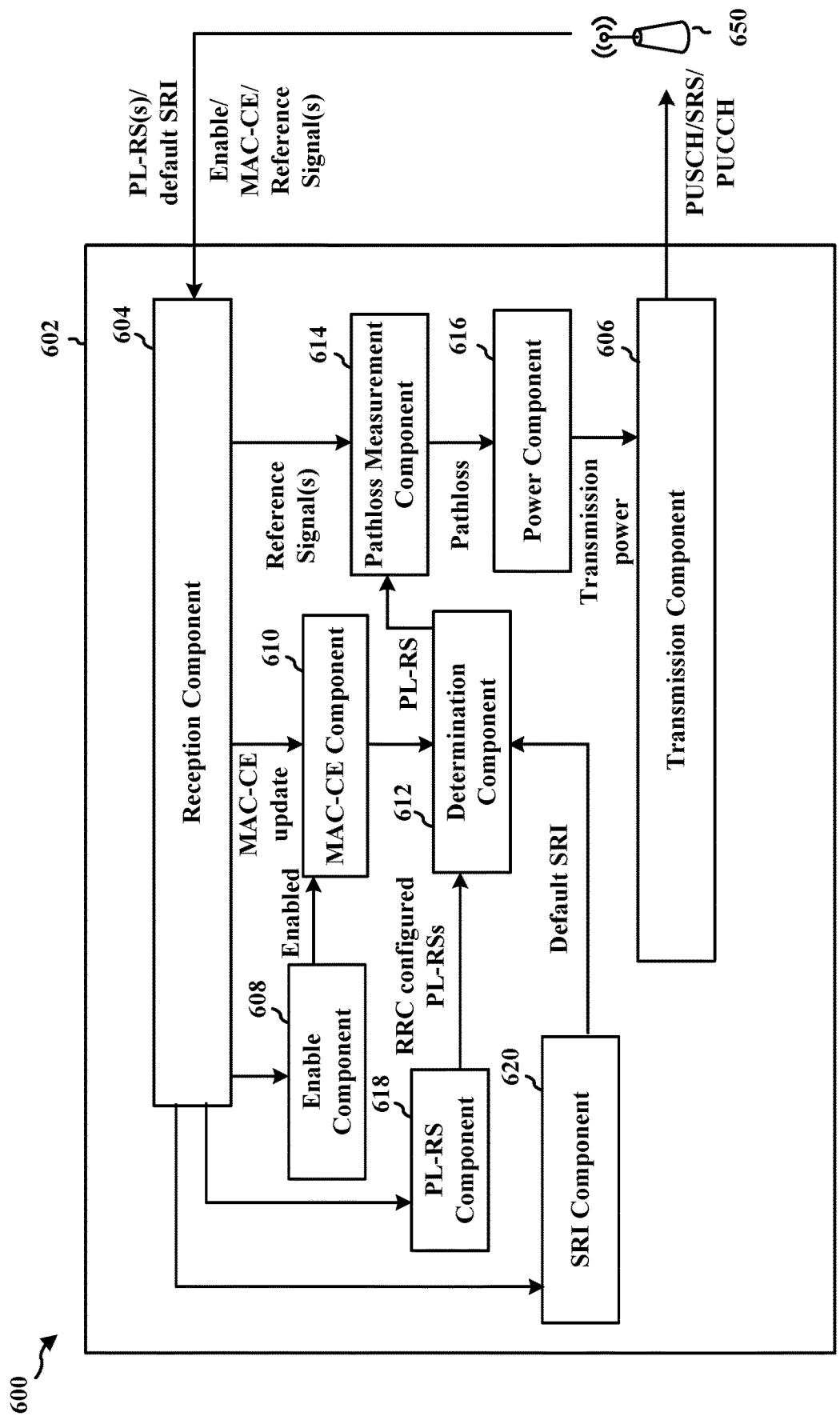
FIG. 6 is a conceptual data flow diagram illustrating the data flow between different means/components in an example apparatus, in accordance with aspects presented herein.

FIG. 6 is a conceptual data flow diagram 600 illustrating the data flow between different means/components in an example apparatus 602. The apparatus may be a UE or a component of a UE. The apparatus 602 includes a reception component 604 configured to receive downlink communication from a base station 650 and a transmission component 606 configured to transmit uplink communication to the base station 650. The apparatus 602 includes an enable component 608 configured to receive an indication from a base station that a MAC-CE activation of a pathloss reference signal is enabled, e.g., as described in connection with 506 in FIG. 5. The apparatus includes a MAC-CE component 610 configured to receive a MAC-CE activating the pathloss reference signal, e.g., as described in connection with 508 in FIG. 5. The apparatus 602 includes a determination component 612 configured to determine a pathloss reference signal based on the MAC-CE and the indication that the MAC-CE activation is enabled, e.g., as described in connection with 510 in FIG. 5. The apparatus 602 may include a pathloss reference signal component 618 configured to receive a configuration of a set of one or more pathloss reference signals for the UE in an RRC configuration, e.g., as described in connection with 502 in FIG. 5. The apparatus 602 may include an SRI component 620 configured to receive a configuration of a default SRI, e.g., as described in connection with 504 in FIG. 5. The apparatus 602 may include a pathloss measurement component 614 configured to estimate a downlink pathloss based on the determined pathloss reference signal, e.g., as described in connection with 512 in FIG. 5. The apparatus 602 may include a power component 616 configured to determine a transmission power for an uplink signal based, at least in part, on the downlink pathloss, e.g., as described in connection with 514 in FIG. 5. The transmission component 606 may be configured to transmit the uplink signal using the determined transmission power, e.g., as described in connection with 516 in FIG. 5.

The apparatus may include additional components that perform each of the blocks of the algorithm in the aforementioned flowcharts of FIG. 5 and the aspects performed by the UE 404. As such, each block in the aforementioned flowcharts of FIG. 5 and the aspects performed by UE 404 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 7:
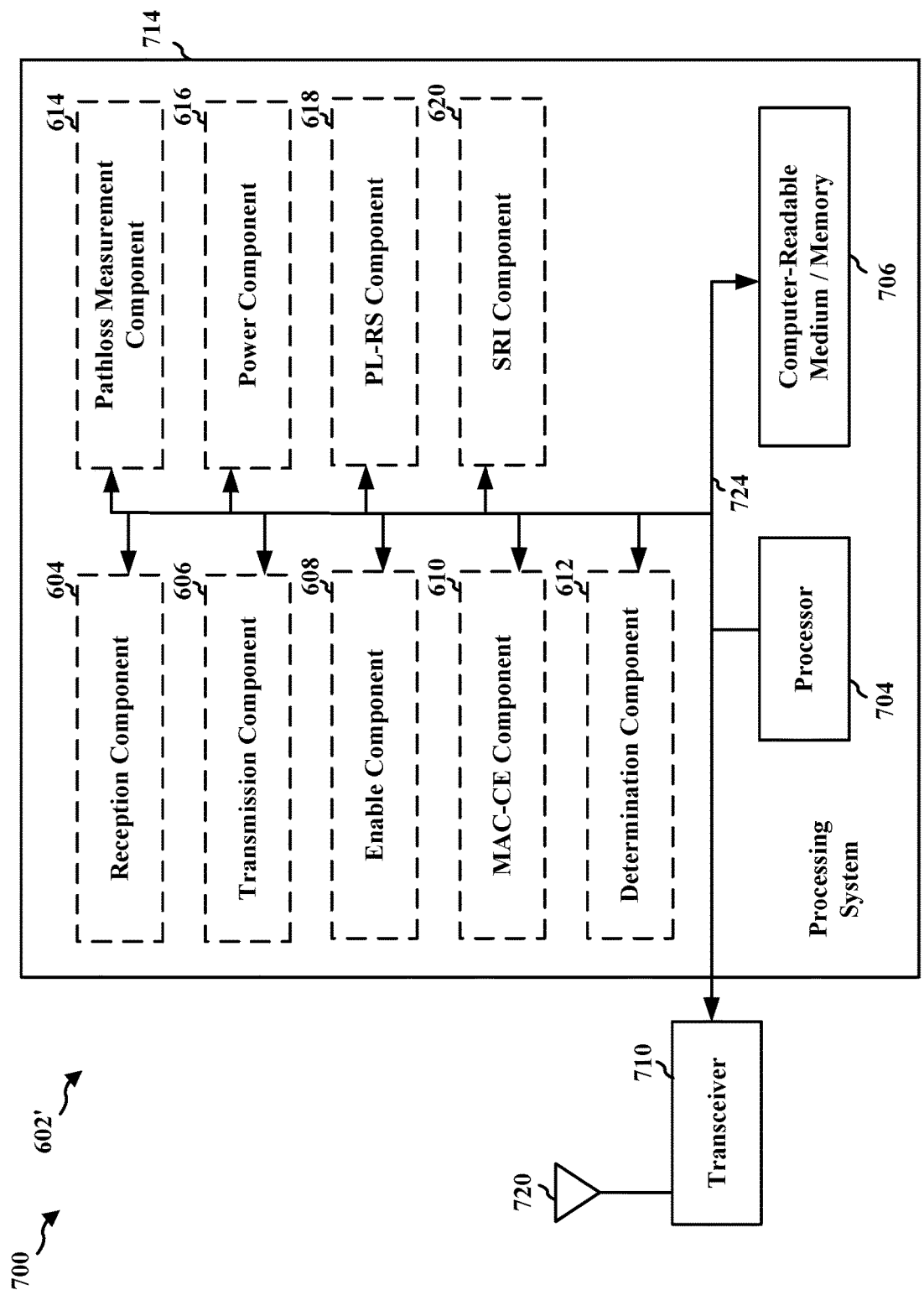
FIG. 7 is a diagram illustrating an example of a hardware implementation for an apparatus employing a processing system, in accordance with aspects presented herein.

FIG. 7 is a diagram 700 illustrating an example of a hardware implementation for an apparatus 602' employing a processing system 714. The processing system 714 may be implemented with a bus architecture, represented generally by the bus 724. The bus 724 may include any number of interconnecting buses and bridges depending on the specific application of the processing system 714 and the overall design constraints. The bus 724 links together various circuits including one or more processors and/or hardware components, represented by the processor 704, the components 604, 606, 608, 610, 612, 614, 616, 618, 620, and the computer-readable medium/memory 706. The bus 724 may also link various other circuits such as timing sources, peripherals, voltage regulators, and power management circuits, which are well known in the art, and therefore, will not be described any further.

The processing system 714 may be coupled to a transceiver 710. The transceiver 710 is coupled to one or more antennas 720. The transceiver 710 provides a means for communicating with various other apparatus over a transmission medium. The transceiver 710 receives a signal from the one or more antennas 720, extracts information from the received signal, and provides the extracted information to the processing system 714, specifically the reception component 604. In addition, the transceiver 710 receives information from the processing system 714, specifically the transmission component 606, and based on the received information, generates a signal to be applied to the one or more antennas 720. The processing system 714 includes a processor 704 coupled to a computer-readable medium/memory 706. The processor 704 is responsible for general processing, including the execution of software stored on the computer-readable medium/memory 706. The software, when executed by the processor 704, causes the processing system 714 to perform the various functions described supra for any particular apparatus. The computer-readable medium/memory 706 may also be used for storing data that is manipulated by the processor 704 when executing software. The processing system 714 further includes at least one of the components 604, 606, 608, 610, 612, 614, 616, 618, 620. The components may be software components running in the processor 704, resident/stored in the computer readable medium/memory 706, one or more hardware components coupled to the processor 704, or some combination thereof. The processing system 714 may be a component of the UE 350 and may include the memory 360 and/or at least one of the TX processor 368, the RX processor 356, and the controller/processor 359. Alternatively, the processing system 714 may be the entire UE (e.g., see 350 of FIG. 3).

In one configuration, the apparatus 602/602' for wireless communication includes means for receiving an indication from a base station that a feature is enabled for a MAC-CE update of a pathloss reference signal, e.g., as described in connection with 506; means for receiving a MAC-CE updating the pathloss reference signal, e.g., as described in connection with 508; and means for determining the pathloss reference signal based on the MAC-CE and the indication indicates that the MAC-CE update of the pathloss reference signal is enabled, e.g., as described in connection with 510. The apparatus may further include means for receiving a configuration of the default SRI in an RRC configuration, e.g., as described in connection with 504. The apparatus may further include means for receiving a configuration of a set of one or more pathloss reference signals for the UE in an RRC configuration, wherein the MAC-CE activates at least one of the one or more pathloss reference signals, e.g., as described in connection with 502. The apparatus may further include means for estimating a downlink pathloss based on the determined pathloss reference signal, e.g., as described in connection with 512. The apparatus may further include means for determining a transmission power for an uplink signal based, at least in part, on the downlink pathloss, e.g., as described in connection with 514. The apparatus may include means for transmitting the uplink signal with the determined transmission power, e.g., as described in connection with 516. The aforementioned means may be one or more of the aforementioned components of the apparatus 602 and/or the processing system 714 of the apparatus 602' configured to perform the functions recited by the aforementioned means. As described supra, the processing system 714 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 8:
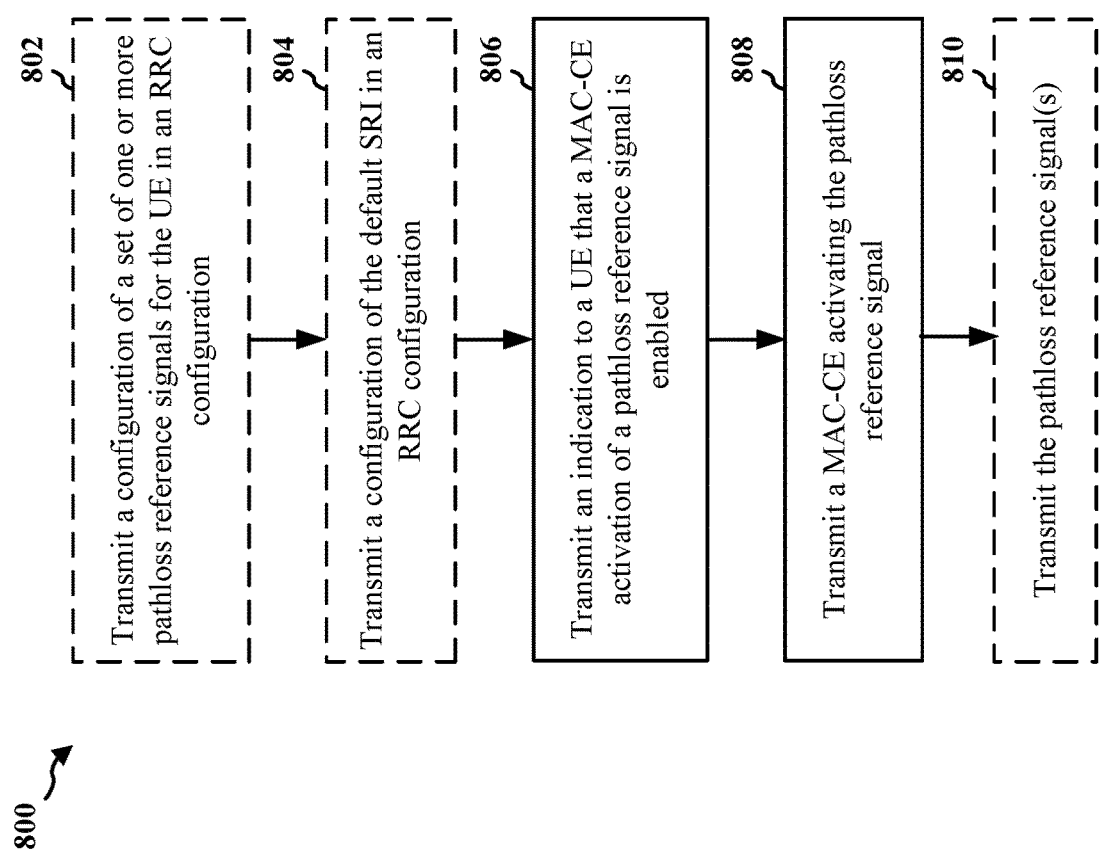
FIG. 8 is a flowchart of a method of wireless communication including enabling MAC-CE updates for a pathloss reference signal, in accordance with aspects presented herein.

FIG. 8 is a flowchart 800 of a method of wireless communication. The method may be performed by a base station or a component of a base station (e.g., the base station 102, 180, 310, 402; which may include the memory 376 and which may be the entire base station 310 or a component of the base station 310, such as the TX processor 316, the RX processor 370, and/or the controller/processor 375). The method may enable the base station to configure a UE for more accurate pathloss measurements.

At 806, the base station transmits an indication to a UE that a MAC-CE activation of a pathloss reference signal is enabled. The transmission may be performed, e.g., by the transmission component 906 and/or enable component 908 of the apparatus 902 in FIG. 9. The indication may be transmitted in RRC signaling. The indication may enable the MAC-CE activation of the pathloss reference signal for a SRS. The indication may enable the MAC-CE activation of the pathloss reference signal update for a PUSCH. The indication may enable the MAC-CE activation of the pathloss reference signal update for a PUSCH that is scheduled by DCI with an SRI field. The indication may enable the MAC-CE activation of the pathloss reference signal update for a PUSCH that is scheduled based on a DCI format without a SRI field. The indication may indicate for the UE to identify the pathloss reference signal based on a default SRI. As illustrated at 804, the base station may transmit a configuration of the default SRI in an RRC configuration. The transmission may be performed, e.g., by the SRI component 920 of the apparatus 902 in FIG. 9. The indication may be a single indication that enable a MAC-CE update for the pathloss reference signal for a SRS and a PUSCH. The indication may include any of the aspects described in connection with the indication 405 in FIG. 4, for example.

At 808, the base station transmits a MAC-CE activating the pathloss reference signal, e.g., activating a particular pathloss reference signal. The transmission may be performed, e.g., by the transmission component 906 and/or MAC-CE component 910 of the apparatus 902 in FIG. 9. The MAC-CE may comprise a reference signal ID for the pathloss reference signal that is activated by the MAC-CE. The MAC-CE may indicate or update a mapping between a pathloss reference signal ID and an SRI for physical uplink shared channel power control. The MAC-CE update may include aspects described in connection with the MAC-CE 407 in FIG. 4.

As illustrated at 802, the base station may transmit a configuration of a set of one or more pathloss reference signals for the UE in an RRC configuration. Then, based on the enablement at 806, the MAC-CE may activate at least one of the one or more pathloss reference signals. The transmission may be performed, e.g., by the pathloss reference signal component 918 of the apparatus 902 in FIG. 9.

As illustrated at 810, the base station may transmit one or more reference signals based as the pathloss reference signals to be measured by the UE. The transmission may be performed, e.g., by the transmission component 906 of the apparatus 902 in FIG. 9.

As such, each block in the aforementioned flowchart of FIG. 8 may be performed by a component of a base station, such as the RRC flag component 198 and the base station may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 9:
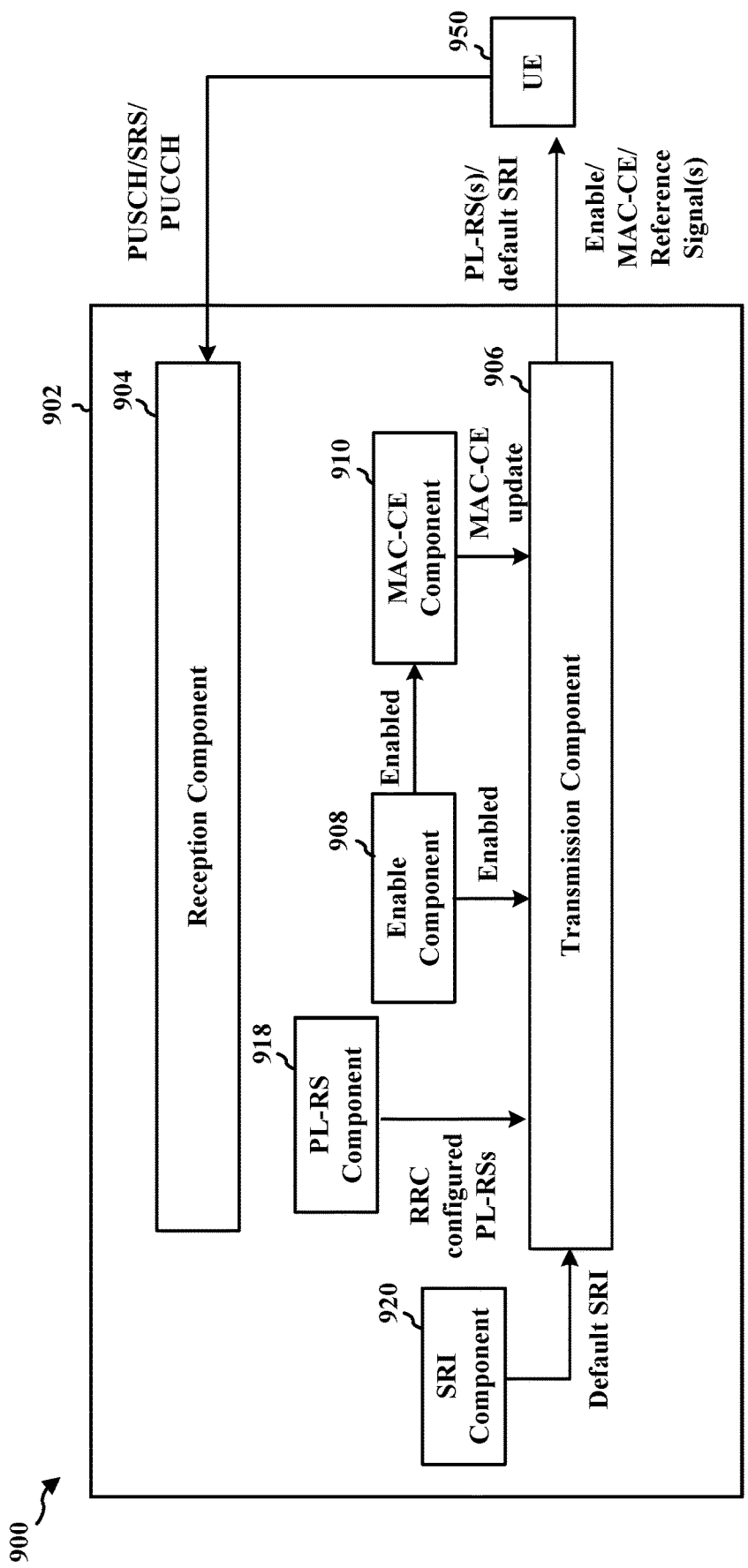
FIG. 9 is a conceptual data flow diagram illustrating the data flow between different means/components in an example apparatus, in accordance with aspects presented herein.

FIG. 9 is a conceptual data flow diagram 900 illustrating the data flow between different means/components in an example apparatus 902. The apparatus may be a base station or a component of a base station. The apparatus 902 includes a reception component 904 configured to receive uplink communication from a UE 950 and a transmission component 906 configured to transmit downlink communication to the UE 950. The apparatus 902 includes an enable component 908 configured to transmit an indication to a UE that a MAC-CE activation of a pathloss reference signal is enabled, e.g., as described in connection with 806 in FIG. 8. The apparatus 902 includes a MAC-CE component 910 configured to transmit a MAC-CE activating the pathloss reference signal, e.g., as described in connection with 808 in FIG. 8. The apparatus 902 may include a pathloss reference signal component 918 configured to transmit a configuration of a set of one or more pathloss reference signals for the UE in an RRC configuration, e.g., as described in connection with 802 in FIG. 8. The apparatus 902 may include an SRI component 920 configured to transmit a configuration of a default SRI, e.g., as described in connection with 804 in FIG. 8.

The apparatus may include additional components that perform each of the blocks of the algorithm in the aforementioned flowcharts of FIG. 8 and the aspects performed by the base station 402. As such, each block in the aforementioned flowcharts of FIG. 8 and the aspects performed by base station 402 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 10:
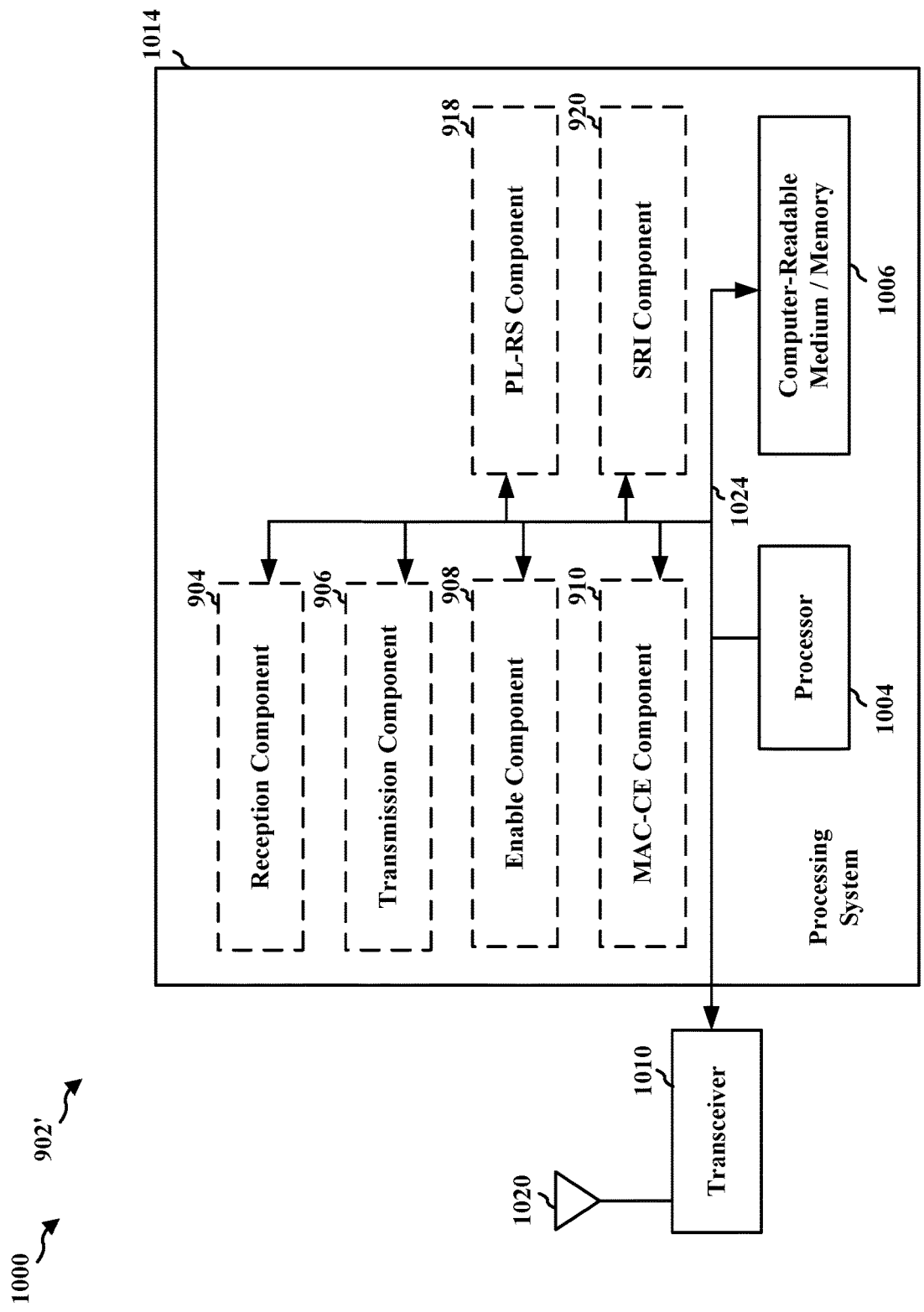
FIG. 10 is a diagram illustrating an example of a hardware implementation for an apparatus employing a processing system, in accordance with aspects presented herein.

FIG. 10 is a diagram 1000 illustrating an example of a hardware implementation for an apparatus 902' employing a processing system 1014. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors and/or hardware components, represented by the processor 1004, the components 904, 906, 908, 910, 918, 920, and the computer-readable medium/memory 1006. The bus 1024 may also link various other circuits such as timing sources, peripherals, voltage regulators, and power management circuits, which are well known in the art, and therefore, will not be described any further.

The processing system 1014 may be coupled to a transceiver 1010. The transceiver 1010 is coupled to one or more antennas 1020. The transceiver 1010 provides a means for communicating with various other apparatus over a transmission medium. The transceiver 1010 receives a signal from the one or more antennas 1020, extracts information from the received signal, and provides the extracted information to the processing system 1014, specifically the reception component 904. In addition, the transceiver 1010 receives information from the processing system 1014, specifically the transmission component 906, and based on the received information, generates a signal to be applied to the one or more antennas 1020. The processing system 1014 includes a processor 1004 coupled to a computer-readable medium/memory 1006. The processor 1004 is responsible for general processing, including the execution of software stored on the computer-readable medium/memory 1006. The software, when executed by the processor 1004, causes the processing system 1014 to perform the various functions described supra for any particular apparatus. The computer-readable medium/memory 1006 may also be used for storing data that is manipulated by the processor 1004 when executing software. The processing system 1014 further includes at least one of the components 904, 906, 908, 910, 918, 920. The components may be software components running in the processor 1004, resident/stored in the computer readable medium/memory 1006, one or more hardware components coupled to the processor 1004, or some combination thereof. The processing system 1014 may be a component of the base station 310 and may include the memory 376 and/or at least one of the TX processor 316, the RX processor 370, and the controller/processor 375. Alternatively, the processing system 1014 may be the entire base station (e.g., see 310 of FIG. 3).

In one configuration, the apparatus 902/902' for wireless communication includes means for transmitting an indication to a UE that a feature is enabled for a MAC-CE update of a pathloss reference signal, e.g., as described in connection with 806; and means for transmitting a MAC-CE updating the pathloss reference signal, e.g., as described in connection with 808. The apparatus may further include means for transmitting a configuration of the default SRI in an RRC configuration, e.g., as described in connection with 804. The apparatus may further include means for transmitting a configuration of a set of one or more pathloss reference signals for the UE in an RRC configuration, wherein the MAC-CE activates at least one of the one or more pathloss reference signals, e.g., as described in connection with 802. The aforementioned means may be one or more of the aforementioned components of the apparatus 902 and/or the processing system 1014 of the apparatus 1002' configured to perform the functions recited by the aforementioned means. As described supra, the processing system 1014 may include the TX processor 316, the RX processor 370, and/or the controller/processor 375. As such, in one configuration, the aforementioned means may be the TX processor 316, the RX processor 370, and/or the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The following examples are illustrative only and aspects thereof may be combined with aspects of other embodiments or teaching described herein, without limitation.

Example 1 is a method of wireless communication at a user equipment (UE), comprising: receiving an indication from a base station that a MAC-CE activation of a pathloss reference signal is enabled; receiving a MAC-CE activating the pathloss reference signal; determining the pathloss reference signal based on the MAC-CE and the indication that indicates that the MAC-CE activation of the pathloss reference signal is enabled; and estimating a downlink pathloss based on the pathloss reference signal that is activated by the MAC-CE.

In Example 2, the method of Example 1 further includes that the pathloss reference signal is for a SRS.

In Example 3, the method of Example 1 or Example 2 further includes that the pathloss reference signal is for a PUSCH.

In Example 4, the method of any of Examples 1-3 further includes that the pathloss reference signal is for the PUSCH that is scheduled by DCI with an SRI field.

In Example 5, the method of any of Examples 1-4 further includes that the pathloss reference signal for the PUSCH that is scheduled based on a DCI format without an SRI field.

In Example 6, the method of any of Examples 1-5 further includes that the indication indicates for the UE to identify the pathloss reference signal based on a default SRI.

In Example 7, the method of any of Examples 1-6 further includes receiving a configuration of the default SRI in an RRC configuration.

In Example 8, the method of any of Examples 1-7 further includes that the indication includes a single indication enables the MAC-CE activation for the pathloss reference signal for an SRS and a PUSCH.

In Example 9, the method of any of Examples 1-8 further includes that the indication is received in RRC signaling.

In Example 10, the method of any of Examples 1-9 further includes that the MAC-CE comprises a reference signal ID for the pathloss reference signal that is activated by the MAC-CE.

In Example 11, the method of any of Examples 1-10 further includes that the MAC-CE indicates a mapping between a pathloss reference signal ID and a SRI for physical uplink shared channel power control.

In Example 12, the method of any of Examples 1-11 further includes receiving a configuration of one or more pathloss reference signals for the UE in an RRC configuration, wherein the MAC-CE activates at least one of the one or more pathloss reference signals.

In Example 13, the method of any of Examples 1-12 further includes determining a transmission power for an uplink signal based, at least in part, on the downlink pathloss.

Example 14 is a device including one or more processors and one or more memories in electronic communication with the one or more processors storing instructions executable by the one or more processors to cause the device to implement a method as in any of Examples 1-13.

Example 15 is a system or apparatus including means for implementing a method or realizing an apparatus as in any of Examples 1-13.

Example 16 is a non-transitory computer readable medium storing instructions executable by one or more processors to cause the one or more processors to implement a method as in any of Examples 1-13.

Example 17 is method of wireless communication at a base station, comprising:
transmitting an indication informing a UE that a MAC-CE activation of a pathloss reference signal is enabled; and transmitting a MAC-CE activating the pathloss reference signal based on the indication that indicates that the MAC-CE activation of the pathloss reference signal is enabled.

In Example 18, the method of Example 17 further includes that the pathloss reference signal is for a SRS.

In Example 19, the method of Example 17 or Example 18 further includes that the pathloss reference signal is for a PUSCH.

In Example 20, the method of any of Examples 17-19 further includes that the pathloss reference signal is for the PUSCH that is scheduled by DCI with a SRI field.

In Example 21, the method of any of Examples 17-20 further includes that the pathloss reference signal is for the PUSCH that is scheduled based on a DCI format without a SRI field.

In Example 22, the method of any of Examples 17-21 further includes that the indication indicates for the UE to identify the pathloss reference signal based on a default SRI.

In Example 23, the method of any of Examples 17-22 further includes configuring the default SRI in an RRC configuration.

In Example 24, the method of any of Examples 17-23 further includes that the indication includes a single indication that enables a MAC-CE activation for the pathloss reference signal for a SRS and a PUSCH.

In Example 25, the method of any of Examples 17-24 further includes that the indication is transmitted in RRC signaling.

In Example 26, the method of any of Examples 17-25 further includes that the reference signal ID for the pathloss reference signal that is activated by the MAC-CE.

In Example 27, the method of any of Examples 17-26 further includes that the MAC-CE indicates a mapping between a pathloss reference signal ID and a SRI for physical uplink shared channel power control.

In Example 28, the method of any of Examples 17-27 further includes configuring one or more pathloss reference signals for the UE in an RRC configuration, wherein the MAC-CE activates at least one of the one or more pathloss reference signals.

Example 29 is a device including one or more processors and one or more memories in electronic communication with the one or more processors storing instructions executable by the one or more processors to cause the device to implement a method as in any of Examples 17-28.

Example 30 is a system or apparatus including means for implementing a method or realizing an apparatus as in any of Examples 17-28.

Example 31 is a non-transitory computer readable medium storing instructions executable by one or more processors to cause the one or more processors to implement a method as in any of Examples 17-28.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a user equipment (UE), comprising:
receiving an indication in radio resource control (RRC) signaling from a base station that a medium access control-control element (MAC-CE) activation of a pathloss reference signal is enabled;
receiving a MAC-CE activating the pathloss reference signal;
determining the pathloss reference signal based on the MAC-CE and the indication that indicates the MAC-CE activation of the pathloss reference signal is enabled; and estimating a downlink pathloss based on the pathloss reference signal that is activated by the MAC-CE.

2. The method of claim 1, wherein the pathloss reference signal is for a sounding reference signal (SRS).

3. The method of claim 1, wherein the pathloss reference signal is for a physical uplink shared channel (PUSCH).

4. The method of claim 3, wherein the pathloss reference signal is for the PUSCH that is scheduled by downlink control information (DCI) with a sounding reference signal resource indicator (SRI) field.

5. The method of claim 3, wherein the pathloss reference signal is for the PUSCH that is scheduled based on a downlink control information (DCI) format without a sounding reference signal resource indicator (SRI) field.

6. The method of claim 5, wherein the pathloss reference signal is based on a default pathloss reference signal.

7. The method of claim 6, further comprising:
receiving a configuration of the default pathloss reference signal in an RRC configuration.

8. The method of claim 1, wherein the indication comprises a single indication that enables the MAC-CE activation for the pathloss reference signal for a sounding reference signal (SRS) and a physical uplink shared channel (PUSCH).

9. The method of claim 1, wherein the MAC-CE comprises a reference signal identifier (ID) for the pathloss reference signal that is activated by the MAC-CE.

10. The method of claim 1, wherein the MAC-CE indicates a mapping between a pathloss reference signal identifier (ID) and a sounding reference signal resource indicator (SRI) for physical uplink shared channel power control.

11. The method of claim 1, further comprising:
receiving a configuration of one or more pathloss reference signals for the UE in an RRC configuration, wherein the MAC-CE activates at least one of the one or more pathloss reference signals.

12. The method of claim 11, wherein a number of the one or more pathloss reference signals configured for the UE in the RRC configuration exceeds 4.

13. The method of claim 1, further comprising:
determining a transmission power for an uplink signal based, at least in part, on the downlink pathloss.

14. An apparatus for wireless communication at a user equipment (UE), comprising:
memory; and
at least one processor coupled to the memory, the memory and the at least one processor being configured to:
receive an indication in radio resource control (RRC) signaling from a base station that a medium access control-control element (MAC-CE) activation of a pathloss reference signal is enabled;
receive a MAC-CE activating the pathloss reference signal;
determine the pathloss reference signal based on the MAC-CE and the indication that indicates the MAC-CE activation of the pathloss reference signal is enabled; and
estimate a downlink pathloss based on the pathloss reference signal that is activated by the MAC-CE.

15. The apparatus of claim 14, wherein the at least one processor is further configured to:
receive a configuration of one or more pathloss reference signals for the UE in an RRC configuration, wherein the MAC-CE activates at least one of the one or more pathloss reference signals.

16. The apparatus of claim 14, wherein the pathloss reference signal is for a sounding reference signal (SRS).

17. The apparatus of claim 14, wherein the pathloss reference signal is for a physical uplink shared channel (PUSCH).

18. The apparatus of claim 17, wherein the pathloss reference signal is for the PUSCH that is scheduled based on a downlink control information (DCI) format without a sounding reference signal resource indicator (SRI) field.

19. The apparatus of claim 18, wherein the pathloss reference signal is based on a default pathloss reference signal.

20. The apparatus of claim 14, wherein the indication comprises a single indication that enables the MAC-CE activation for the pathloss reference signal for a sounding reference signal (SRS) and a physical uplink shared channel (PUSCH).

21. The apparatus of claim 14, wherein the MAC-CE comprises a reference signal identifier (ID) for the pathloss reference signal that is activated by the MAC-CE.

22. The apparatus of claim 14, wherein the MAC-CE indicates a mapping between a pathloss reference signal identifier (ID) and a sounding reference signal resource indicator (SRI) for physical uplink shared channel power control.

23. A method of wireless communication at a base station, comprising:
transmitting an indication in radio resource control (RRC) signaling to a user equipment (UE) that a medium access control-control element (MAC-CE) activation of a pathloss reference signal is enabled; and
transmitting a MAC-CE activating the pathloss reference signal based on the indication that indicates that the MAC-CE activation of the pathloss reference signal is enabled.

24. The method of claim 23, wherein the pathloss reference signal is for a sounding reference signal (SRS).

25. The method of claim 23, wherein the pathloss reference signal is for a physical uplink shared channel (PUSCH).

26. The method of claim 25, wherein the pathloss reference signal is for the PUSCH that is scheduled by downlink control information (DCI) with a sounding reference signal resource indicator (SRI) field.

27. The method of claim 25, wherein the pathloss reference signal is for the PUSCH that is scheduled based on a downlink control information (DCI) format without a sounding reference signal resource indicator (SRI) field.

28. The method of claim 27, wherein the indication indicates for the UE to identify the pathloss reference signal based on a default pathloss reference signal.

29. The method of claim 28, further comprising:
configuring the default pathloss reference signal in an RRC configuration.

30. The method of claim 23, wherein the indication comprises a single indication that enables a MAC-CE activation for the pathloss reference signal for a sounding reference signal (SRS) and a physical uplink shared channel (PUSCH).

31. The method of claim 23, wherein the MAC-CE comprises a reference signal identifier (ID) for the pathloss reference signal that is activated by the MAC-CE.

32. The method of claim 23, wherein the MAC-CE indicates a mapping between a pathloss reference signal identifier (ID) and a sounding reference signal resource indicator (SRI) for physical uplink shared channel power control.

33. The method of claim 23, further comprising:
configuring one or more pathloss reference signals for the UE in an RRC configuration, wherein the MAC-CE activates at least one of the one or more pathloss reference signals.

34. An apparatus for wireless communication at a base station, comprising:
memory; and
at least one processor coupled to the memory, the memory and the at least one processor being configured to:
transmit an indication in radio resource control (RRC) signaling to a user equipment (UE) that a medium access control-control element (MAC-CE) activation of a pathloss reference signal is enabled; and
transmit a MAC-CE activating the pathloss reference signal based on the indication that indicates that the MAC-CE activation of the pathloss reference signal is enabled.

35. The apparatus of claim 34, wherein the at least one processor is further configured to:
configure one or more pathloss reference signals for the UE in an RRC configuration, wherein the MAC-CE activates at least one of the one or more pathloss reference signals.

36. A non-transitory computer-readable medium storing computer executable code, the code when executed by at least one processor causes the at least one processor to:
receive an indication in radio resource control (RRC) signaling from a base station that a medium access control-control element (MAC-CE) activation of a pathloss reference signal is enabled;
receive a MAC-CE activating the pathloss reference signal;
determine the pathloss reference signal based on the MAC-CE and the indication that indicates the MAC-CE activation of the pathloss reference signal is enabled; and
estimate a downlink pathloss based on the pathloss reference signal that is activated by the MAC-CE.

37. The non-transitory computer-readable medium of claim 36, wherein the pathloss reference signal is for a sounding reference signal (SRS).

38. The non-transitory computer-readable medium of claim 36, wherein the pathloss reference signal is for a physical uplink shared channel (PUSCH).

39. The non-transitory computer-readable medium of claim 38, wherein the pathloss reference signal is for the PUSCH that is scheduled based on a downlink control information (DCI) format without a sounding reference signal resource indicator (SRI) field.

40. The non-transitory computer-readable medium of claim 39, wherein the pathloss reference signal is based on a default pathloss reference signal.

41. The non-transitory computer-readable medium of claim 36, wherein the indication comprises a single indication that enables the MAC-CE activation for the pathloss reference signal for a sounding reference signal (SRS) and a physical uplink shared channel (PUSCH).

42. The non-transitory computer-readable medium of claim 36, wherein the MAC-CE comprises a reference signal identifier (ID) for the pathloss reference signal that is activated by the MAC-CE.

43. The non-transitory computer-readable medium of claim 36, wherein the MAC-CE indicates a mapping between a pathloss reference signal identifier (ID) and a sounding reference signal resource indicator (SRI) for physical uplink shared channel power control.

44. The non-transitory computer-readable medium of claim 36, wherein the code when executed by at least one processor further causes the at least one processor to:
receive a configuration of one or more pathloss reference signals for a user equipment (UE) in an RRC configuration, wherein the MAC-CE activates at least one of the one or more pathloss reference signals.

45. An apparatus for wireless communication, comprising:
means for receiving an indication in radio resource control (RRC) signaling from a base station that a medium access control-control element (MAC-CE) activation of a pathloss reference signal is enabled;
means for receiving a MAC-CE activating the pathloss reference signal;
means for determining the pathloss reference signal based on the MAC-CE and the indication that indicates the MAC-CE activation of the pathloss reference signal is enabled; and
means for estimating a downlink pathloss based on the pathloss reference signal that is activated by the MAC-CE.

* * * * *